United States Patent
Yuan et al.

(10) Patent No.: US 12,237,892 B2
(45) Date of Patent: Feb. 25, 2025

(54) UPLINK MODE SWITCHING

(71) Applicant: QUALCOMM Incorporated, San Diego, CA (US)

(72) Inventors: Fang Yuan, Beijing (CN); Arumugam Chendamarai Kannan, San Diego, CA (US); Wooseok Nam, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 18/251,193

(22) PCT Filed: Jan. 6, 2021

(86) PCT No.: PCT/CN2021/070408
§ 371 (c)(1),
(2) Date: Apr. 28, 2023

(87) PCT Pub. No.: WO2022/147676
PCT Pub. Date: Jul. 14, 2022

(65) Prior Publication Data
US 2023/0412218 A1    Dec. 21, 2023

(51) Int. Cl.
*H04B 7/0456* (2017.01)
(52) U.S. Cl.
CPC .................. *H04B 7/0456* (2013.01)
(58) Field of Classification Search
CPC .................................................... H04B 7/0456
See application file for complete search history.

(56) References Cited

U.S. PATENT DOCUMENTS

| 2020/0091978 | A1* | 3/2020 | Noh ..................... H04B 7/0695 |
| 2020/0212972 | A1  | 7/2020 | Zhang et al. |
| 2020/0252241 | A1* | 8/2020 | Park .................... H04L 25/0224 |

FOREIGN PATENT DOCUMENTS

| CN | 101741445 | A | 6/2010 |
| CN | 108111253 | A | 6/2018 |
| CN | 109417442 | A | 3/2019 |
| CN | 110601733 | A | 12/2019 |
| CN | 111052786 |   | 4/2020 |
| CN | 111434048 | A | 7/2020 |

OTHER PUBLICATIONS

International Search Report and Written Opinion—PCT/CN2021/070408—ISA/EPO—Sep. 27, 2021.

* cited by examiner

*Primary Examiner* — Rahel Guarino
(74) *Attorney, Agent, or Firm* — Harrity & Harrity, LLP

(57) ABSTRACT

Various aspects of the present disclosure generally relate to wireless communication. In some aspects, a user equipment (UE) may receive an indication of whether an uplink multiple input multiple output (MIMO) communication is to be codebook-based (CB) or non-codebook-based (NCB). The UE may transmit the uplink MIMO communication as CB or NCB based at least in part on the indication. Numerous other aspects are described.

22 Claims, 11 Drawing Sheets

UPLINK MODE SWITCHING

CROSS-REFERENCE TO RELATED APPLICATION

This Patent Application is a 371 national stage of PCT Application No. PCT/CN2021/070408 filed on Jan. 6, 2021, entitled "UPLINK MODE SWITCHING," and assigned to the assignee hereof. The disclosure of the prior Application is considered part of and is incorporated by reference into this Patent Application.

FIELD OF THE DISCLOSURE

Aspects of the present disclosure generally relate to wireless communication and to techniques and apparatuses for uplink mode switching.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication performed by a user equipment (UE) includes receiving an indication of whether an uplink multiple input multiple output (MIMO) communication is to be codebook-based (CB) or non-codebook-based (NCB) and transmitting the uplink MIMO communication as CB or NCB based at least in part on the indication.

In some aspects, a method of wireless communication performed by a base station includes determining an indication for an uplink MIMO communication from a UE, indicating whether the uplink MIMO communication is to be CB or NCB. The method includes transmitting the indication to the UE and receiving the uplink MIMO communication as CB or NCB based at least in part on transmitting the indication.

In some aspects, a UE for wireless communication includes a memory and one or more processors operatively coupled to the memory, the memory and the one or more processors configured to receive an indication of whether an uplink MIMO communication is to be CB or NCB and transmit the uplink MIMO communication as CB or NCB based at least in part on the indication.

In some aspects, a base station for wireless communication includes a memory and one or more processors operatively coupled to the memory, the memory and the one or more processors configured to determine an indication for an uplink MIMO communication from a UE, indicating whether the uplink MIMO communication is to be CB or NCB. The one or more processors are configured to transmit the indication to the UE and receive the uplink MIMO communication as CB or NCB based at least in part on transmitting the indication.

In some aspects, a non-transitory computer-readable medium storing a set of instructions for wireless communication includes one or more instructions that, when executed by one or more processors of a UE, cause the UE to receive an indication of whether an uplink MIMO communication is to be CB or NCB and transmit the uplink MIMO communication as CB or NCB based at least in part on the indication.

In some aspects, a non-transitory computer-readable medium storing a set of instructions for wireless communication includes one or more instructions that, when executed by one or more processors of a base station, cause the base station to determine an indication for an uplink MIMO communication from a UE, indicating whether the uplink MIMO communication is to be CB or NCB, transmit the indication to the UE, and receive the uplink MIMO communication as CB or NCB based at least in part on transmitting the indication.

In some aspects, an apparatus for wireless communication includes means for receiving an indication of whether an uplink MIMO communication is to be CB or NCB, and means for transmitting the uplink MIMO communication as CB or NCB based at least in part on the indication.

In some aspects, an apparatus for wireless communication includes means for determining an indication for an uplink MIMO communication from a UE, indicating whether the uplink MIMO communication is to be CB or NCB, means for transmitting the indication to the UE, and means for receiving the uplink MIMO communication as CB or NCB based at least in part on transmitting the indication.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
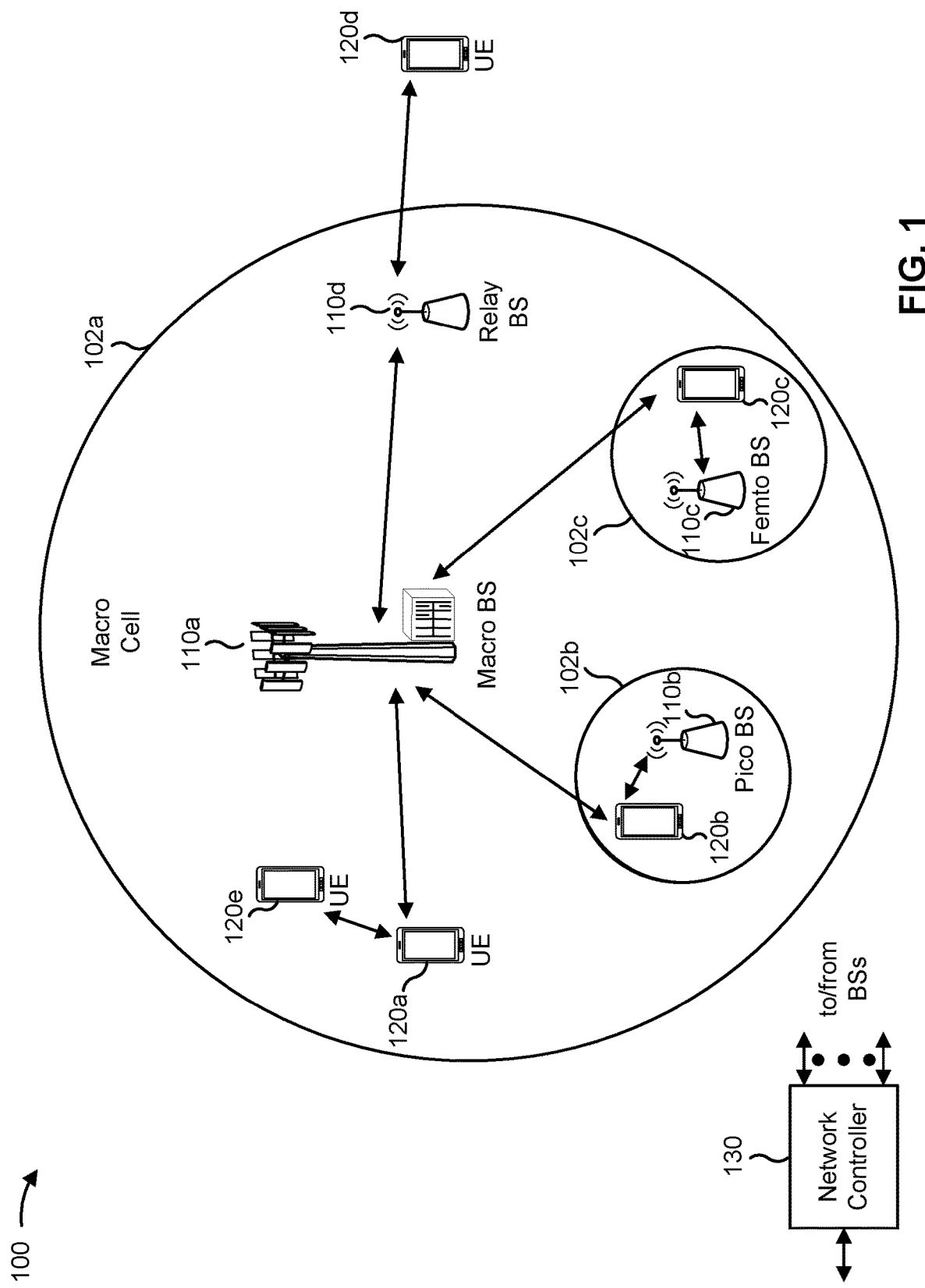
FIG. 1 is a diagram illustrating an example of a wireless network, in accordance with various aspects of the present disclosure.

FIG. 1 is a diagram illustrating an example of a wireless network 100, in accordance with various aspects of the present disclosure. The wireless network 100 may be or may include elements of a 5G (NR) network and/or an LTE network, among other examples. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110*a* may be a macro BS for a macro cell 102*a*, a BS 110*b* may be a pico BS for a pico cell 102*b*, and a BS 110*c* may be a femto BS for a femto cell 102*c*. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110*d* may communicate with macro BS 110*a* and a UE 120*d* in order to facilitate communication between BS 110*a* and UE 120*d*. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, directly or indirectly, via a wireless or wireline backhaul.

UEs 120 (e.g., 120*a*, 120*b*, 120*c*) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120*a* and UE 120*e*) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
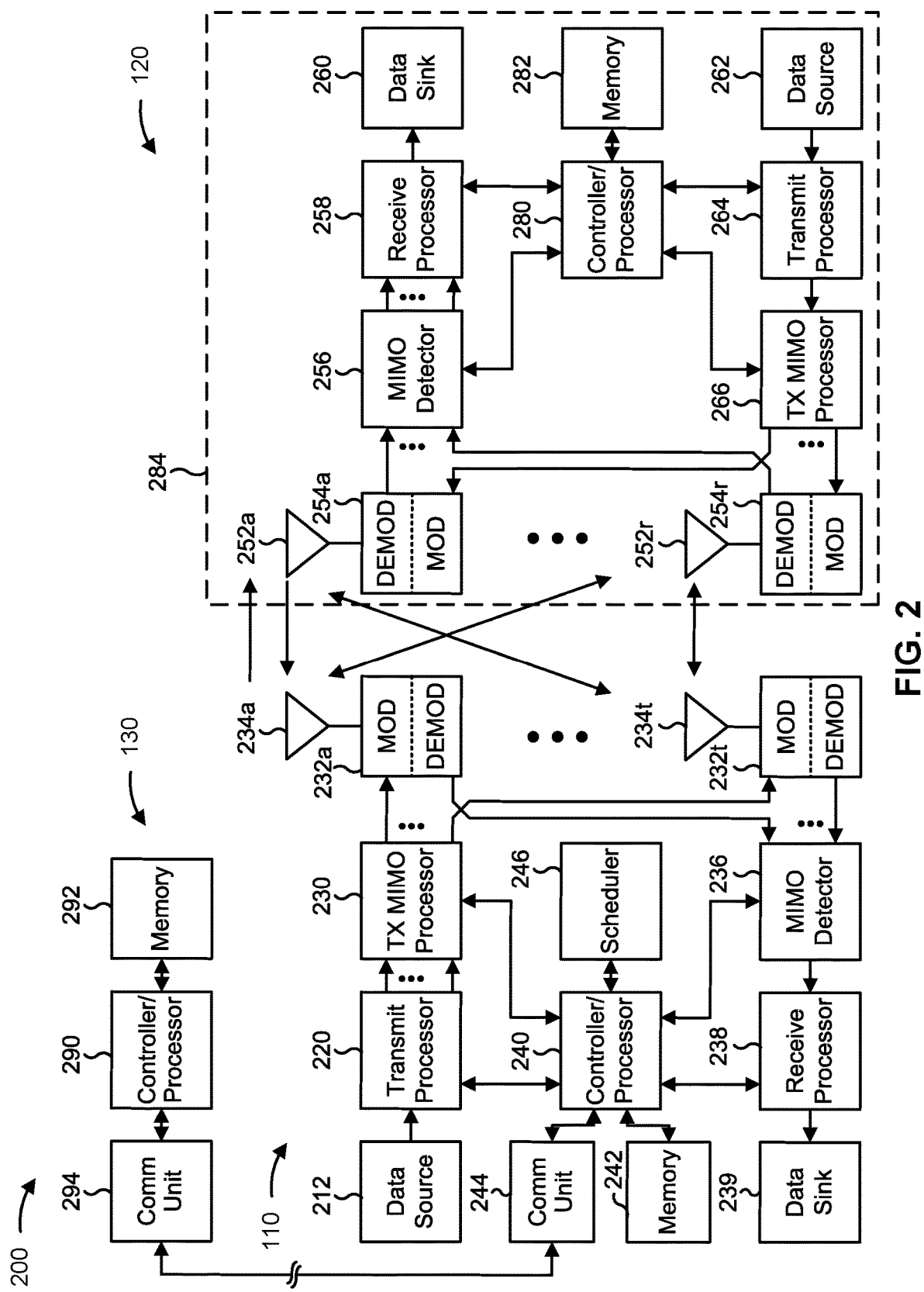
FIG. 2 is a diagram illustrating an example of a base station in communication with a user equipment (UE) in a wireless network, in accordance with various aspects of the present disclosure.

FIG. 2 is a diagram illustrating an example 200 of a base station 110 in communication with a UE 120 in a wireless network 100, in accordance with various aspects of the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM or CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein, for example, as described with reference to FIGS. 1-11.

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein, for example, as described with reference to FIGS. 1-11.

Controller/processor 240 of base station 110, controller/processor 280 of UE 120, and/or any other component(s) of FIG. 2 may perform one or more techniques associated with uplink mode switching, as described in more detail elsewhere herein. For example, controller/processor 240 of base station 110, controller/processor 280 of UE 120, and/or any other component(s) of FIG. 2 may perform or direct operations of, for example, process 800 of FIG. 8, process 900 of FIG. 9, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 800 of FIG. 8, process 900 of FIG. 9, and/or other processes as described herein. In some aspects, executing instructions may include running the instructions, converting the instructions, compiling the instructions, and/or interpreting the instructions, among other examples.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

In some aspects, UE 120 includes means for receiving an indication of whether an uplink MIMO communication is to be codebook-based (CB) or non-codebook-based (NCB), and/or means for transmitting the uplink MIMO communication as CB or NCB based at least in part on the indication. The means for UE 120 to perform operations described herein may include, for example, one or more of antenna 252, demodulator 254, MIMO detector 256, receive processor 258, transmit processor 264, TX MIMO processor 266, modulator 254, controller/processor 280, or memory 282.

In some aspects, UE 120 includes means for padding bits after a scheduling request indicator (SRI) field received in DCI for NCB such that a bit length of the DCI for NCB matches a bit length of the DCI for CB.

In some aspects, UE 120 includes means for determining a preference for CB or for NCB based at least in part on a determination that a measurement of a downlink reference signal satisfies a measurement threshold, and/or means for transmitting the preference.

In some aspects, base station 110 includes means for determining an indication for an uplink MIMO communication from a UE, indicating whether the uplink MIMO communication is to be CB or NCB; means for transmitting the indication to the UE; and/or means for receiving the uplink MIMO communication as CB or NCB based at least in part on transmitting the indication. The means for base station 110 to perform operations described herein may include, for example, one or more of transmit processor 220, TX MIMO processor 230, modulator 232, antenna 234, demodulator 232, MIMO detector 236, receive processor 238, controller/processor 240, memory 242, or scheduler 246.

In some aspects, base station 110 includes means for aligning a DCI size for CB with a DCI size for NCB. In some aspects, base station 110 includes means for receiving, from the UE, a preference for CB or NCB for uplink MIMO communications, where determining the indication includes determining the indication based at least in part on the preference received from the UE.

As indicated above, FIG. 2 is provided as an example. Other examples may differ from what is described with regard to FIG. 2.

Figure 3:
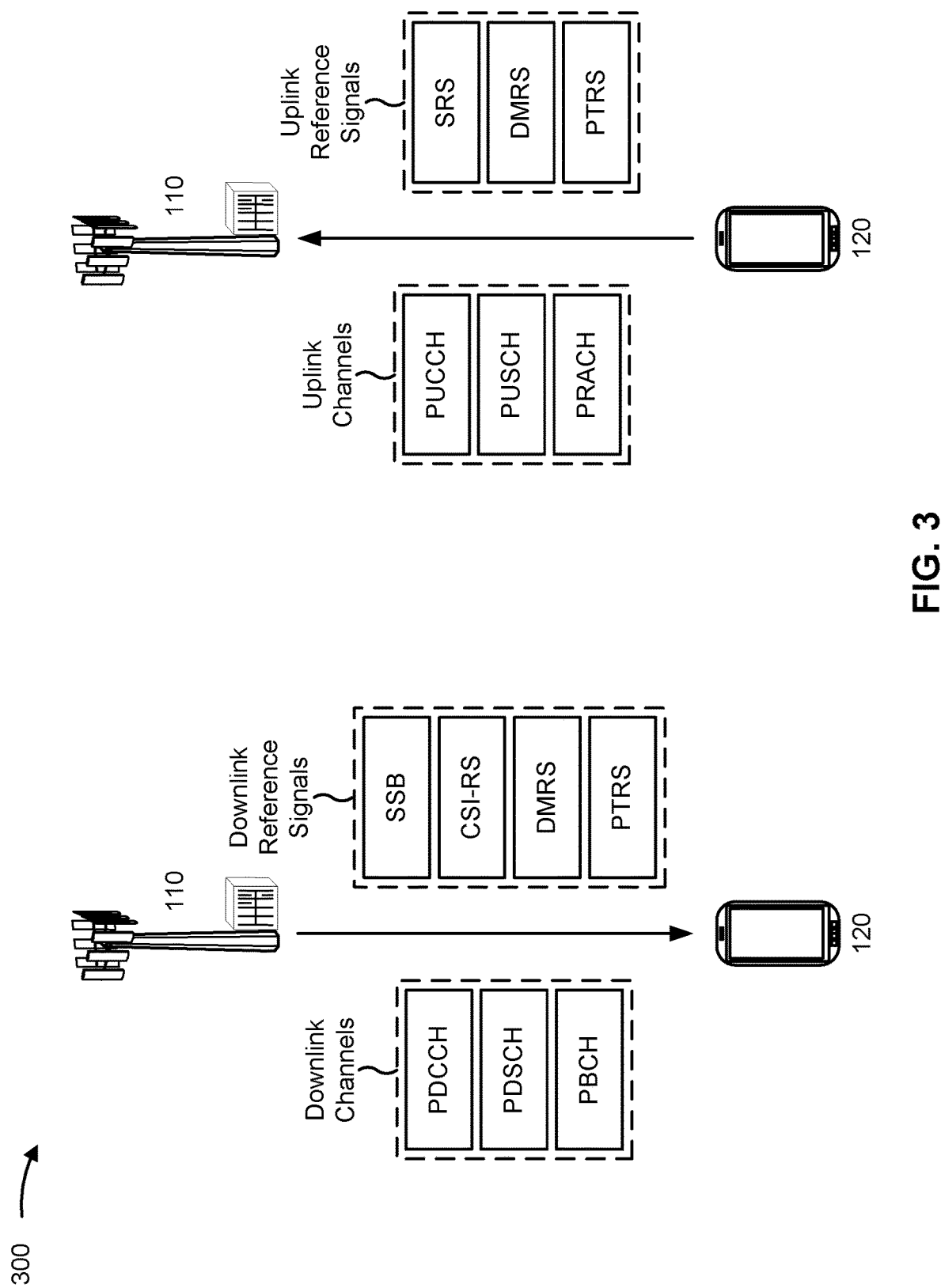
FIG. 3 is a diagram illustrating an example of physical channels and reference signals in a wireless network, in accordance with various aspects of the present disclosure.

FIG. 3 is a diagram illustrating an example 300 of physical channels and reference signals in a wireless network, in accordance with various aspects of the present disclosure. As shown in FIG. 3, downlink channels and downlink reference signals may carry information from a base station 110 to a UE 120, and uplink channels and uplink reference signals may carry information from a UE 120 to a base station 110.

As shown, a downlink channel may include a physical downlink control channel (PDCCH) that carries downlink control information (DCI), a physical downlink shared channel (PDSCH) that carries downlink data, or a physical broadcast channel (PBCH) that carries system information, among other examples. In some aspects, PDSCH communications may be scheduled by PDCCH communications. As further shown, an uplink channel may include a physical uplink control channel (PUCCH) that carries uplink control information (UCI), a physical uplink shared channel (PUSCH) that carries uplink data, or a physical random access channel (PRACH) used for initial network access, among other examples. In some aspects, UE 120 may transmit acknowledgement (ACK) or negative acknowledgement (NACK) feedback (e.g., ACK/NACK feedback or ACK/NACK information) in UCI on the PUCCH and/or the PUSCH.

As further shown, a downlink reference signal may include a synchronization signal block (SSB), a channel state information (CSI) reference signal (CSI-RS), a demodulation reference signal (DMRS), a positioning reference signal (PRS), or a phase tracking reference signal (PTRS), among other examples. As also shown, an uplink reference signal may include a sounding reference signal (SRS), a DMRS, or a PTRS, among other examples.

An SSB may carry information used for initial network acquisition and synchronization, such as a primary synchronization signal (PSS), a secondary synchronization signal (SSS), a PBCH, and a PBCH DMRS. An SSB is sometimes referred to as a synchronization signal/PBCH (SS/PBCH) block. In some aspects, base station 110 may transmit multiple SSBs on multiple corresponding beams, and the SSBs may be used for beam selection.

A CSI-RS may carry information used for downlink channel estimation (e.g., downlink CSI acquisition), which may be used for scheduling, link adaptation, or beam management, among other examples. Base station 110 may configure a set of CSI-RSs for UE 120, and UE 120 may measure the configured set of CSI-RSs. Based at least in part on the measurements, UE 120 may perform channel estimation and may report channel estimation parameters to base station 110 (e.g., in a CSI report), such as a CQI, a precoding matrix indicator (PMI), a CSI-RS resource indicator (CRI), a layer indicator (LI), a rank indicator (RI), or an RSRP, among other examples. Base station 110 may use the CSI report to select transmission parameters for downlink communications to UE 120, such as a number of transmission layers (e.g., a rank), a precoding matrix (e.g., a precoder), an MCS, or a refined downlink beam (e.g., using a beam refinement procedure or a beam management procedure), among other examples.

A DMRS may carry information used to estimate a radio channel for demodulation of an associated physical channel (e.g., PDCCH, PDSCH, PBCH, PUCCH, or PUSCH). The design and mapping of a DMRS may be specific to a physical channel for which the DMRS is used for estimation. DMRSs are UE-specific, can be beamformed, can be confined in a scheduled resource (e.g., rather than transmitted on a wideband), and can be transmitted only when necessary. As shown, DMRSs are used for both downlink communications and uplink communications.

A PTRS may carry information used to compensate for oscillator phase noise. Typically, the phase noise increases as the oscillator carrier frequency increases. Thus, PTRS can be utilized at high carrier frequencies, such as millimeter wave frequencies, to mitigate phase noise. The PTRS may be used to track the phase of the local oscillator and to enable suppression of phase noise and common phase error (CPE). As shown, PTRSs are used for both downlink communications (e.g., on the PDSCH) and uplink communications (e.g., on the PUSCH).

A PRS may carry information used to enable timing or ranging measurements of UE 120 based on signals transmitted by base station 110 to improve observed time difference of arrival (OTDOA) positioning performance. For example, a PRS may be a pseudo-random Quadrature Phase Shift Keying (QPSK) sequence mapped in diagonal patterns with shifts in frequency and time to avoid collision with cell-specific reference signals and control channels (e.g., a PDCCH). In general, a PRS may be designed to improve detectability by UE 120, which may need to detect downlink signals from multiple neighboring base stations in order to perform OTDOA-based positioning. Accordingly, UE 120 may receive a PRS from multiple cells (e.g., a reference cell and one or more neighbor cells), and may report a reference signal time difference (RSTD) based on OTDOA measurements associated with the PRSs received from the multiple cells. In some aspects, base station 110 may then calculate a position of UE 120 based on the RSTD measurements reported by UE 120.

An SRS may carry information used for uplink channel estimation, which may be used for scheduling, link adaptation, precoder selection, or beam management, among other examples. Base station 110 may configure one or more SRS resource sets for UE 120, and UE 120 may transmit SRSs on the configured SRS resource sets. An SRS resource set may have a configured usage, such as uplink CSI acquisition, downlink CSI acquisition for reciprocity-based operations, uplink beam management, among other examples. Base station 110 may measure the SRSs, may perform channel estimation based at least in part on the measurements, and may use the SRS measurements to configure communications with UE 120.

As indicated above, FIG. 3 is provided as an example. Other examples may differ from what is described with regard to FIG. 3.

Figure 4:
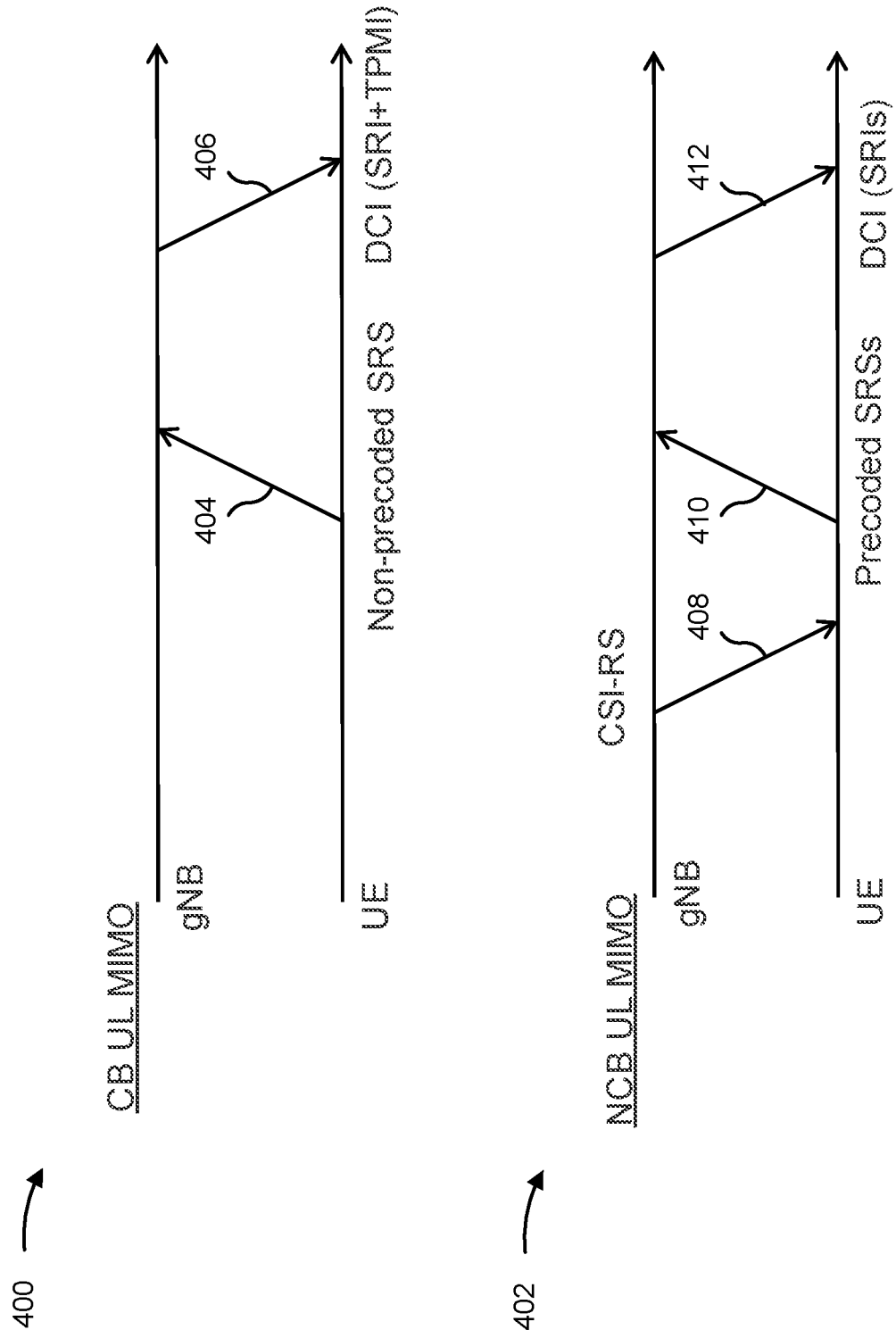
FIG. 4 is a diagram illustrating examples of uplink multiple-input-multiple-output modes, in accordance with various aspects of the present disclosure.

FIG. 4 is a diagram illustrating examples 400 and 402 of uplink MIMO modes, in accordance with various aspects of the present disclosure.

In some communications systems, such as 5G or NR, a UE may transmit an uplink (UL) MIMO communication to a base station (e.g., gNB) using beamforming. The beamforming may use a codebook, which specifies how data layers are mapped to antenna ports. In NR Release 15, there are two UL MIMO transmission modes, codebook (CB) and non-codebook (NCB). Example 400 shows codebook generation and transmission by a gNB for CB UL MIMO. The gNB may indicate a precoder that is based on a pre-defined codebook, and the precoder may be a codeword selected from the codebook. The gNB may indicate UL MIMO precoders based at least in part on a measurement of an SRS 404 (identified by an SRI), a transmitted precoding matrix index (TPMI), and/or a number of layers. For example, the UE may transmit SRS 404 with multiple non-precoded ports, and the gNB may indicate a proper precoder selected from the codebook based at least in part on a measurement of non-precoded SRS 404. The gNB may transmit an indication of the precoder matrix to the UE in DCI 406. DCI 406 may identify the SRI and/or the TPMI.

For NCB UL MIMO, a gNB may indicate a precoder that is based on UE measurements of downlink signals. For example, the UE may measure a downlink reference signal, such as a CSI-RS, to derive a set of proper precoders. The UE may further transmit a set of SRSs respectively precoded with one of the precoders, and the gNB may indicate a proper subset of precoders, selected based at least in part on a measurement of the precoded SRSs.

Example 402 shows NCB UL MIMO, where a UE may calculate UL MIMO precoders based at least in part on a measurement of a CSI-RS 408. For example, the UE may calculate a precoder matrix that corresponds to a transmission rank, a PUSCH precoder, and/or an SRS 410 (e.g., wideband SRI) that may be indicated in DCI 412.

UL MIMO performance may be affected by interference, and NCB precoders may not be as accurate as CB precoders. NCB precoders are calculated by the UE and thus the UE may not have information about interference at the gNB. Without such information, the UE may not be able to optimize UL precoders for communications that are subject to inference at the gNB. As a result, if the UE performs NCB UL MIMO when there is unknown interference, the UE may experience degraded communications that waste processing resources and signaling resources. Furthermore, if downlink interference is strong, NCB UL MIMO performance may be degraded because measurements by the UE on the CSI-RS may not be accurate.

According to various aspects described herein, a UE may be configured to switch between NCB UL MIMO and CB UL MIMO. The UE may switch based at least in part on an indication from a gNB, which is aware of interference at the gNB. The UE may receive the indication in a medium access control control element (MAC-CE) or in DCI. In this way, the UE may use a codebook that is optimized for any interference at the gNB. As a result, the UE and the gNB conserve processing resources and signaling resources by accounting for interference that may degrade communications.

As indicated above, FIG. 4 provides some examples. Other examples may differ from what is described with regard to FIG. 4.

Figure 5:
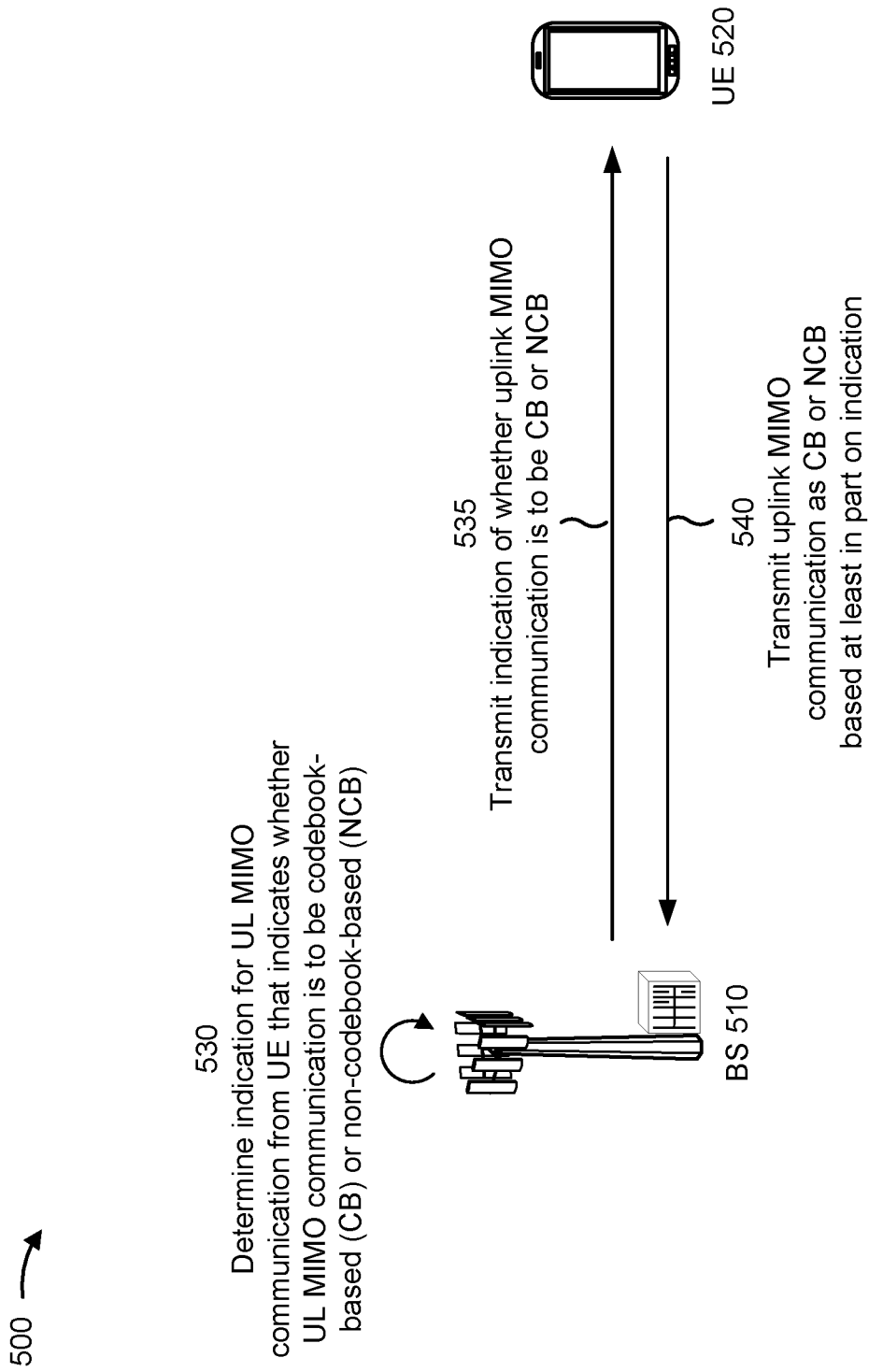
FIG. 5 is a diagram illustrating an example of uplink mode switching, in accordance with various aspects of the present disclosure.

FIG. 5 is a diagram illustrating an example 500 of uplink mode switching, in accordance with various aspects of the present disclosure. FIG. 5 shows a BS 510 (e.g., a BS 110 depicted in FIGS. 1-3) and a UE 520 (e.g., a UE 120 depicted in FIGS. 1-3) that may communicate with each other on a wireless downlink or a wireless uplink.

As shown by reference number 530, UE 520 may determine an indication for an UL MIMO communication from a UE. The indication may indicate whether the uplink MIMO communication is to be CB or NCB. In some aspects, a codebook may indicate beams associated with a plurality of levels. A level of beam may be associated with a particular beam width and a particular beam gain. As the level changes, the beam width and the beam gain may change. The usage of the levels of beams may improve efficiency of beam refinement operations of the UE 520.

In some aspects, a codebook may indicate a parent-child relationship of two or more beams. For example, a parent beam may be a beam associated with a lower level (e.g., a larger beam width and a lower beam gain) and a child beam may be a beam associated with a higher level. UE 520 may move from a parent beam to a corresponding child beam as part of a beam refinement procedure. In some aspects, a codebook may indicate a particular number of beams associated with a subarray, where the number of beams per subarray may be an odd number of beams or an even number of beams.

In some aspects, a codebook may indicate beams associated with each MIMO layer of UE 520. For example, MIMO may enable multi-layer communication by UE 520, thereby increasing throughput by increased complexity. The codebook may include codewords for each beam to be generated at each MIMO layer. In some aspects, the codebook may indicate a number of beams, per level and per subarray, that is the same for each MIMO layer. This may simplify determination of the beams and improve consistency of performance of UE 520 across different MIMO layers.

In some aspects, a codebook may be based at least in part on per-antenna measurement of a performance of UE 520. In this case, the codebook may cause excitement of some antennas of the UE but not of other antennas of the UE. For example, the codebook may cause excitement of only some antennas of a particular subarray or of a particular antenna module, and thus efficiency and beamforming gain of UE 520 may be improved by a codebook generated using a per-antenna measurement procedure.

BS 510 may determine whether to indicate CB or NCB to UE 520 based at least in part on interference detected and/or measured at BS 510. For example, BS 510 may measure an SRS from UE 520. If a measurement of the SRS satisfies a measurement threshold, BS 510 may indicate NCB. If the measurement of the SRS does not satisfy the measurement threshold, BS 510 may indicate CB.

As shown by reference number 535, BS 510 may transmit the indication to UE 520. BS 510 may transmit the indication in a MAC-CE. In some aspects, BS 510 may transmit the indication in DCI.

UE 520 may receive the indication. As shown by reference number 540, UE 520 may transmit the uplink MIMO communication as CB or NCB based at least in part on the indication. In this way, UE 520 may use a precoder that accounts for interference detected by BS 510. This may include switching from CB to NCB, or switching from NCB to CB.

As indicated above, FIG. 5 is provided as an example. Other examples may differ from what is described with regard to FIG. 5.

Figure 6:
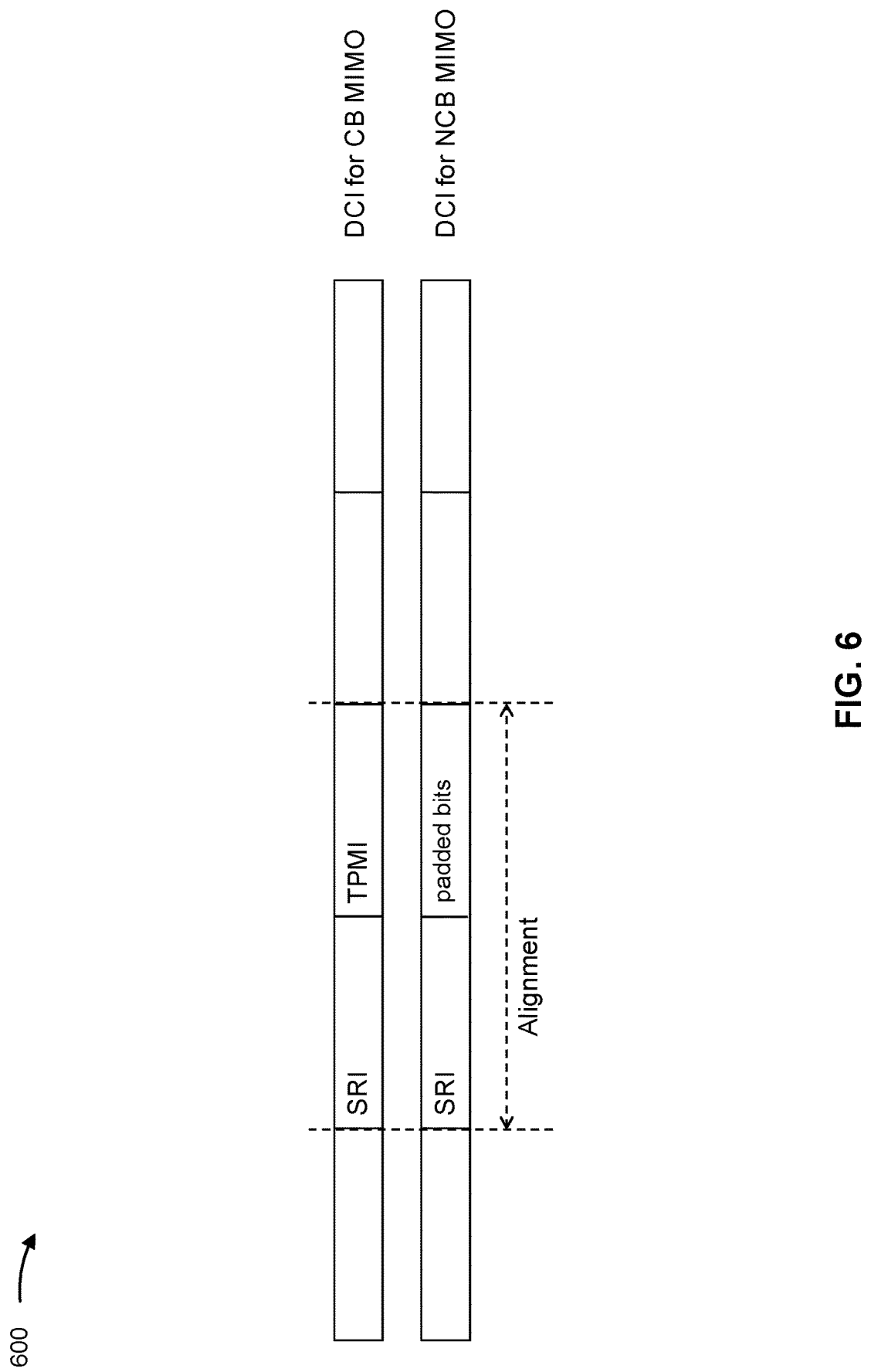
FIG. 6 is a diagram illustrating an example of downlink control information alignment for uplink mode switching, in accordance with various aspects of the present disclosure.

FIG. 6 is a diagram illustrating an example 600 of DCI alignment for uplink mode switching, in accordance with various aspects of the present disclosure.

A base station may transmit an indication of CB UL MIMO or NCB UL MIMO to a UE. In some aspects, the size of the DCI may be aligned, whether the DCI is scheduling a CB UL MIMO transmission or an NCB UL MIMO transmission. For example, the DCI for NCB has a field of SRI for MIMO precoding and rank indication, and the DCI for CB has a field of SRI and a field of TPMI for MIMO precoding and rank indication. As shown by example 600, the bit length of SRI in the DCI for NCB may be set to be the same as the bit length of both SRI and TPMI in the DCI for CB. To achieve this alignment, the UE may pad bits after an SRI field in the DCI for NCB such that the bit length of the DCI for NCB matches (e.g., is equal to) the bit length of the DCI for CB. In some aspects, to achieve this alignment, the UE may pad bits after an SRI field and an TPMI field in the DCI for CB such that the bit length of the DCI for NCB matches (e.g., is equal to) the bit length of the DCI for NCB. The UE may pad the bits with zeros, data, control information, reference signals, and/or random bits.

As indicated above, FIG. 6 is provided as an example. Other examples may differ from what is described with regard to FIG. 6.

Figure 7:
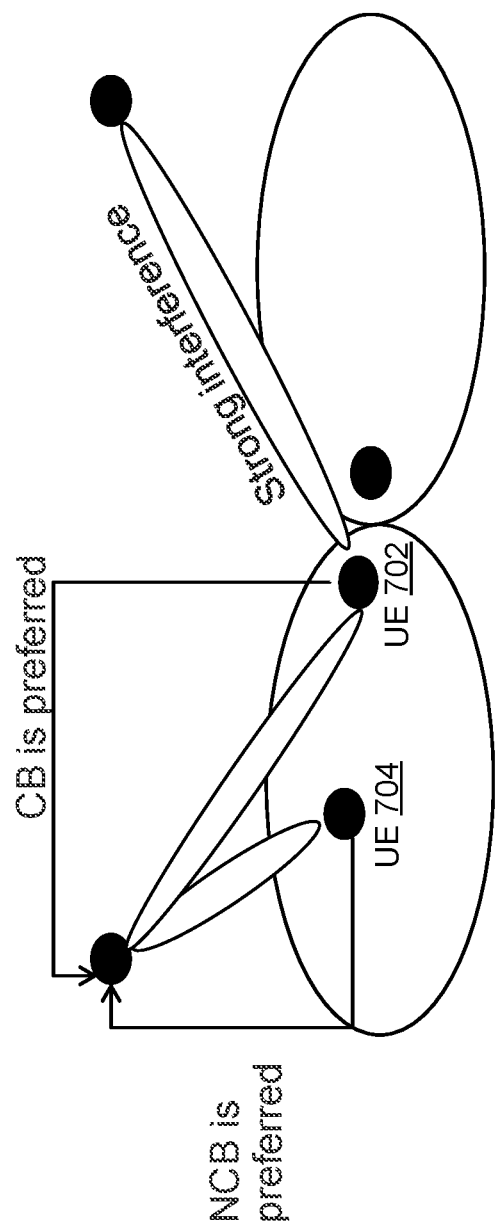
FIG. 7 is a diagram illustrating an example of uplink mode switching, in accordance with various aspects of the present disclosure.

FIG. 7 is a diagram illustrating an example 700 of uplink mode switching, in accordance with various aspects of the present disclosure.

In some aspects, a UE may determine a preferred UL MIMO mode, either CB or NCB, based at least in part on a UE capability and/or a measurement of a CSI-RS or other another indicator of signal quality or interference (e.g., RSRP, RSRQ, signal to noise ratio (SNR)). For example, as shown by example 700, if downlink interference is strong (e.g., satisfies an interference threshold), such as for a UE 702 on a cell edge, UE 520 may indicate a preference for CB. If the downlink interference is weak (e.g., does not satisfy an interference threshold), such as for UE 704, UE 520 may indicate a preference for NCB. In some aspects, UE 520 may indicate a preference that is different than a previously indicated preference. For example, when UE 702 moves toward the location of UE 704, UE 520 may have previously indicated a preference for CB but now may indicate a preference for NCB.

In some aspects, the UE may transmit an indication of the preferred UL MIMO mode in a CSI report, which may be a periodic CSI report. The CSI report may have two parts of contents, and the UE may indicate a preferred UL MIMO mode in CSI part 1.

As indicated above, FIG. 7 is provided as an example. Other examples may differ from what is described with regard to FIG. 7.

Figure 8:
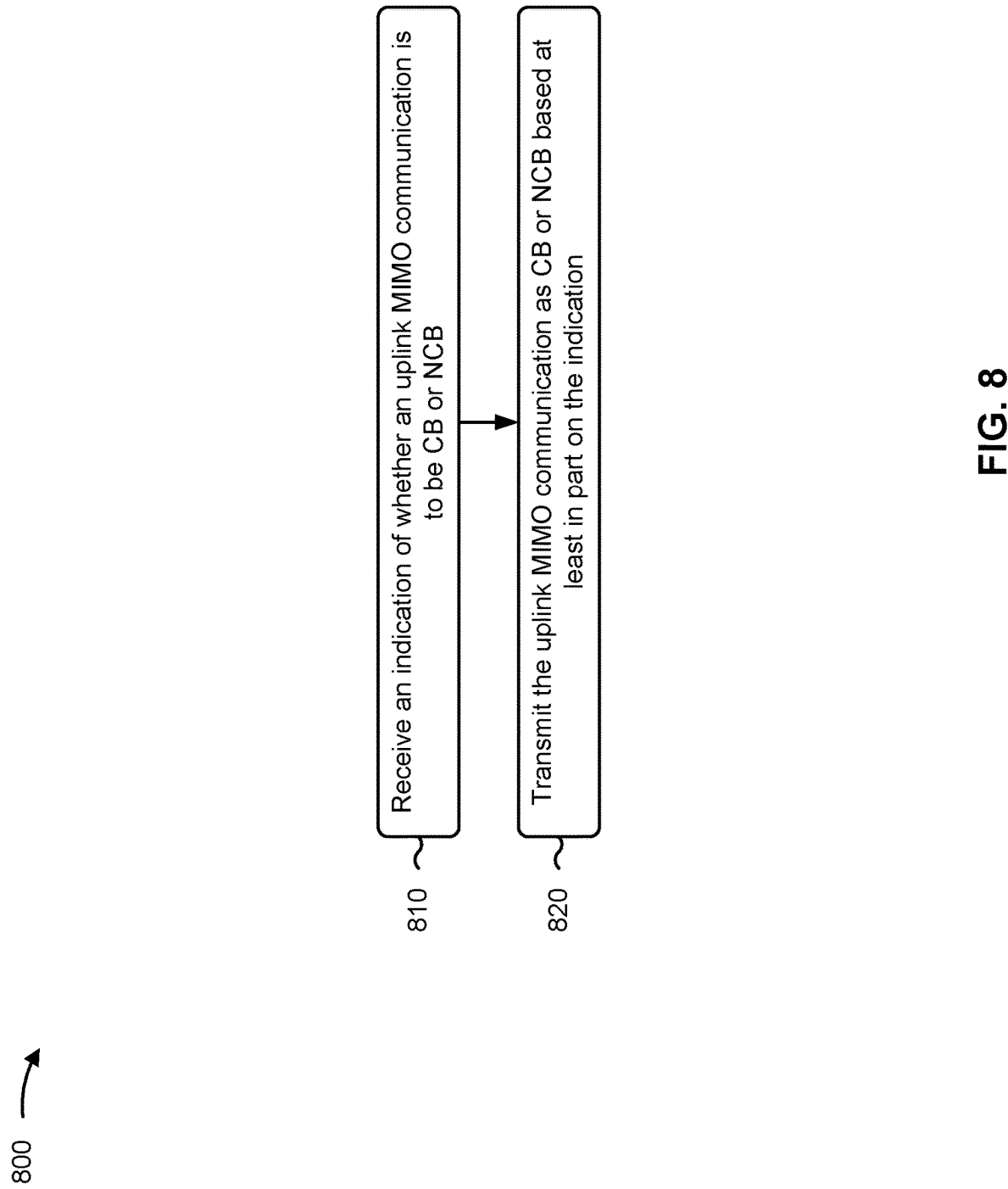
FIG. 8 is a diagram illustrating an example process performed, for example, by a UE, in accordance with various aspects of the present disclosure.

FIG. 8 is a diagram illustrating an example process 800 performed, for example, by a UE, in accordance with various aspects of the present disclosure. Example process 800 is an example where the UE (e.g., UE 120 depicted in FIGS. 1-3, the UE in FIG. 4, UE 520 depicted in FIG. 5) performs operations associated with uplink mode switching.

As shown in FIG. 8, in some aspects, process 800 may include receiving an indication of whether an uplink MIMO communication is to be CB or NCB (block 810). For example, the UE (e.g., using reception component 1002 depicted in FIG. 10) may receive an indication of whether an uplink MIMO communication is to be CB or NCB, as described above.

As further shown in FIG. 8, in some aspects, process 800 may include transmitting the uplink MIMO communication as CB or NCB based at least in part on the indication (block 820). For example, the UE (e.g., using transmission component 1004 depicted in FIG. 10) may transmit the uplink MIMO communication as CB or NCB based at least in part on the indication, as described above.

Process 800 may include additional aspects, such as any single aspect or any combination of aspects described below and/or in connection with one or more other processes described elsewhere herein.

In a first aspect, receiving the indication includes receiving the indication in a MAC-CE.

In a second aspect, alone or in combination with the first aspect, receiving the indication includes receiving the indication in DCI that schedules the uplink MIMO communication.

In a third aspect, alone or in combination with one or more of the first and second aspects, a DCI size for CB is aligned with a DCI size for NCB.

In a fourth aspect, alone or in combination with one or more of the first through third aspects, a DCI size for CB is a same bit length as a DCI size for NCB.

In a fifth aspect, alone or in combination with one or more of the first through fourth aspects, process 800 includes padding bits after an SRI field received in DCI for NCB such that a bit length of the DCI for NCB matches a bit length of the DCI for CB.

In a sixth aspect, alone or in combination with one or more of the first through fifth aspects, process 800 includes determining a preference for CB or for NCB based at least in part on a determination that a measurement of a downlink reference signal satisfies a measurement threshold, and transmitting the preference.

In a seventh aspect, alone or in combination with one or more of the first through sixth aspects, determining the preference includes determining that the preference is for CB based at least in part on a determination that downlink interference exceeds an interference threshold.

In an eighth aspect, alone or in combination with one or more of the first through seventh aspects, determining the preference includes determining that the preference is for NCB based at least in part on a determination that downlink interference does not exceed an interference threshold.

In a ninth aspect, alone or in combination with one or more of the first through eighth aspects, transmitting the preference includes transmitting the preference in a CSI report.

In a tenth aspect, alone or in combination with one or more of the first through ninth aspects, the CSI report is a periodic CSI report.

In an eleventh aspect, alone or in combination with one or more of the first through tenth aspects, the preference is reported in CSI part 1.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
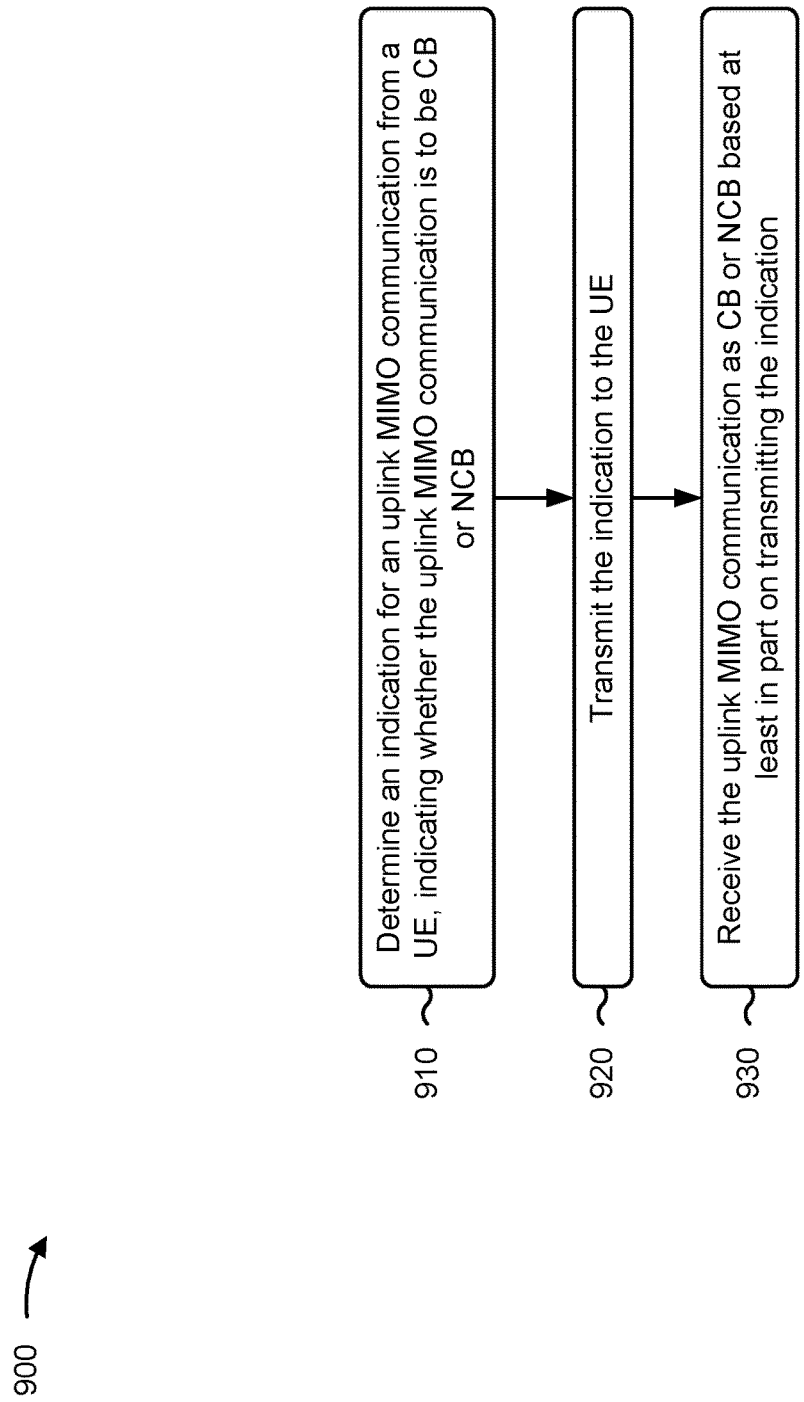
FIG. 9 is a diagram illustrating an example process performed, for example, by a base station, in accordance with various aspects of the present disclosure.

FIG. 9 is a diagram illustrating an example process 900 performed, for example, by a base station, in accordance with various aspects of the present disclosure. Example process 900 is an example where the base station (e.g., base station 110 depicted in FIGS. 1-3, the gNB depicted in FIG. 4, BS 510 depicted in FIG. 5) performs operations associated with uplink mode switching.

As shown in FIG. 9, in some aspects, process 900 may include determining an indication for an uplink MIMO communication from a UE, indicating whether the uplink MIMO communication is to be CB or NCB (block 910). For example, the base station (e.g., using determination component 1108 depicted in FIG. 11) may determine an indication for an uplink MIMO communication from a UE, indicating whether the uplink MIMO communication is to be CB or NCB, as described above.

As further shown in FIG. 9, in some aspects, process 900 may include transmitting the indication to the UE (block 920). For example, the base station (e.g., using transmission component 1104 depicted in FIG. 11) may transmit the indication to the UE, as described above.

As further shown in FIG. 9, in some aspects, process 900 may include receiving the uplink MIMO communication as CB or NCB based at least in part on transmitting the indication (block 930). For example, the base station (e.g., using reception component 1102 depicted in FIG. 11) may receive the uplink MIMO communication as CB or NCB based at least in part on transmitting the indication, as described above.

Process 900 may include additional aspects, such as any single aspect or any combination of aspects described below and/or in connection with one or more other processes described elsewhere herein.

In a first aspect, transmitting the indication includes transmitting the indication in a MAC-CE.

In a second aspect, alone or in combination with the first aspect, transmitting the indication includes transmitting the indication in DCI that schedules the uplink MIMO communication.

In a third aspect, alone or in combination with one or more of the first and second aspects, process 900 includes aligning a DCI size for CB with a DCI size for NCB.

In a fourth aspect, alone or in combination with one or more of the first through third aspects, a DCI size for CB is a same bit length as a DCI size for NCB.

In a fifth aspect, alone or in combination with one or more of the first through fourth aspects, process 900 includes receiving, from the UE, a preference for CB or NCB for uplink MIMO communications, where determining the indication includes determining the indication based at least in part on the preference received from the UE.

In a sixth aspect, alone or in combination with one or more of the first through fifth aspects, receiving the preference includes receiving the preference in a CSI report.

In a seventh aspect, alone or in combination with one or more of the first through sixth aspects, the preference is reported in CSI part 1.

In an eighth aspect, alone or in combination with one or more of the first through seventh aspects, determining the indication includes determining the indication based at least in part on a measurement of interference by the base station.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

Figure 10:
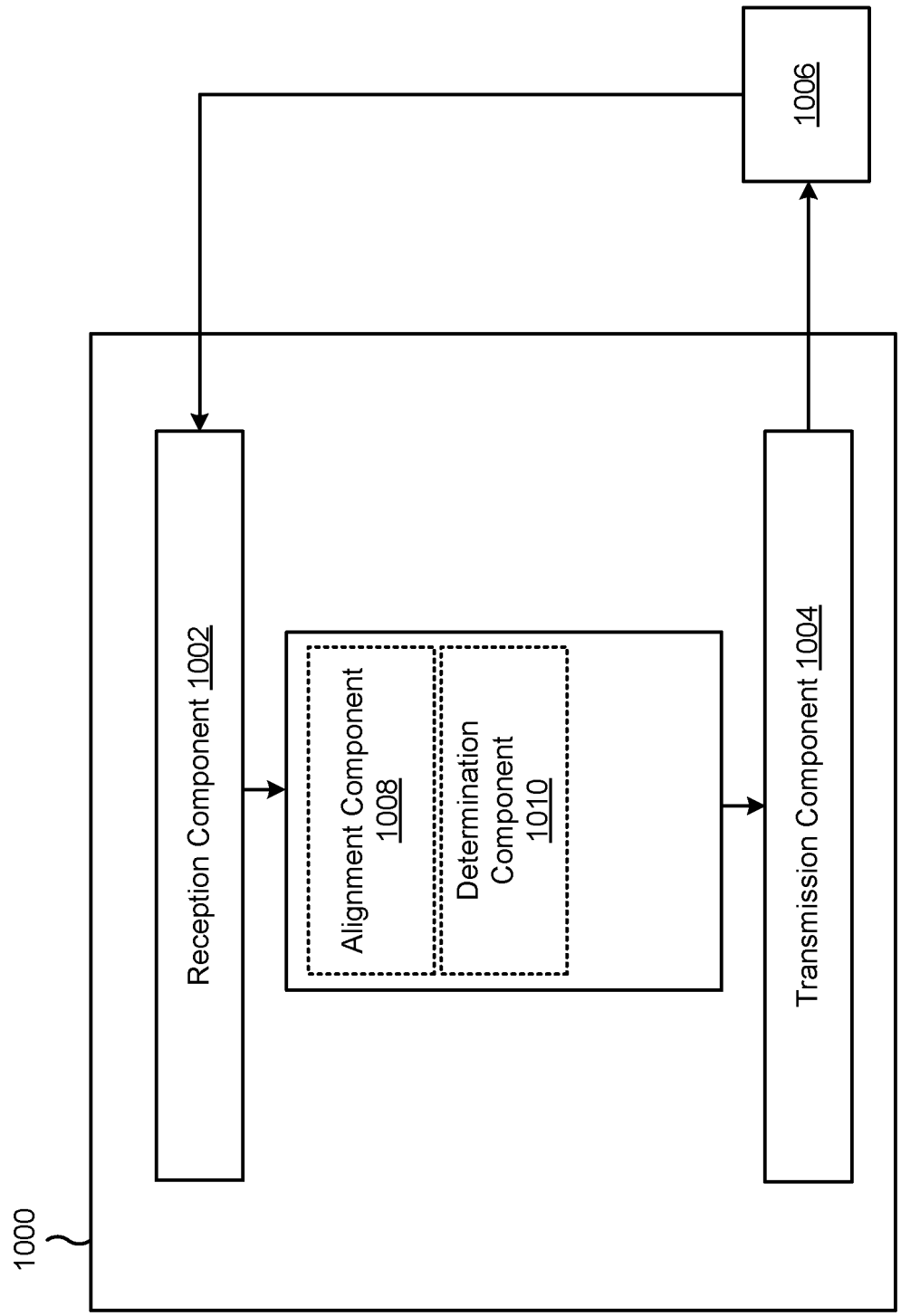
FIGS. 10-11 are block diagrams of example apparatuses for wireless communication, in accordance with various aspects of the present disclosure.

FIG. 10 is a block diagram of an example apparatus 1000 for wireless communication. The apparatus 1000 may be a UE, or a UE may include the apparatus 1000. In some aspects, the apparatus 1000 includes a reception component 1002 and a transmission component 1004, which may be in communication with one another (for example, via one or more buses and/or one or more other components). As shown, the apparatus 1000 may communicate with another apparatus 1006 (such as a UE, a base station, or another wireless communication device) using the reception component 1002 and the transmission component 1004. As further shown, the apparatus 1000 may include an alignment component 1008 and/or a determination component 1010, among other examples.

In some aspects, the apparatus 1000 may be configured to perform one or more operations described herein in connection with FIGS. 1-7. Additionally, or alternatively, the apparatus 1000 may be configured to perform one or more processes described herein, such as process 800 of FIG. 8.

In some aspects, the apparatus 1000 and/or one or more components shown in FIG. 10 may include one or more components of the UE described above in connection with FIG. 2. Additionally, or alternatively, one or more components shown in FIG. 10 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1002 may receive communications, such as reference signals, control information, data communications, or a combination thereof, from the apparatus 1006. The reception component 1002 may provide received communications to one or more other components of the apparatus 1000. In some aspects, the reception component 1002 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1006. In some aspects, the reception component 1002 may include one or more antennas, a demodulator, a MIMO detector, a receive processor, a controller/processor, a memory, or a combination thereof, of the UE described above in connection with FIG. 2.

The transmission component 1004 may transmit communications, such as reference signals, control information, data communications, or a combination thereof, to the apparatus 1006. In some aspects, one or more other components of the apparatus 1006 may generate communications and may provide the generated communications to the transmission component 1004 for transmission to the apparatus 1006. In some aspects, the transmission component 1004 may perform signal processing on the generated communications (such as filtering, amplification, modulation, digital-to-analog conversion, multiplexing, interleaving, mapping, or encoding, among other examples), and may transmit the processed signals to the apparatus 1006. In some aspects, the transmission component 1004 may include one or more antennas, a modulator, a transmit MIMO processor, a transmit processor, a controller/processor, a memory, or a combination thereof, of the UE described above in connection with FIG. 2. In some aspects, the transmission component 1004 may be co-located with the reception component 1002 in a transceiver.

The reception component 1002 may receive an indication of whether an uplink MIMO communication is to be CB or NCB. The transmission component 1004 may transmit the uplink MIMO communication as CB or NCB based at least in part on the indication.

The alignment component 1008 may pad bits after an SRI field received in DCI for NCB such that a bit length of the DCI for NCB matches a bit length of the DCI for CB.

The determination component 1010 may determine a preference for CB or for NCB based at least in part on a determination that a measurement of a downlink reference signal satisfies a measurement threshold. The transmission component 1004 may transmit the preference.

The number and arrangement of components shown in FIG. 10 are provided as an example. In practice, there may be additional components, fewer components, different components, or differently arranged components than those shown in FIG. 10. Furthermore, two or more components shown in FIG. 10 may be implemented within a single component, or a single component shown in FIG. 10 may be implemented as multiple, distributed components. Additionally, or alternatively, a set of (one or more) components shown in FIG. 10 may perform one or more functions described as being performed by another set of components shown in FIG. 10.

Figure 11:
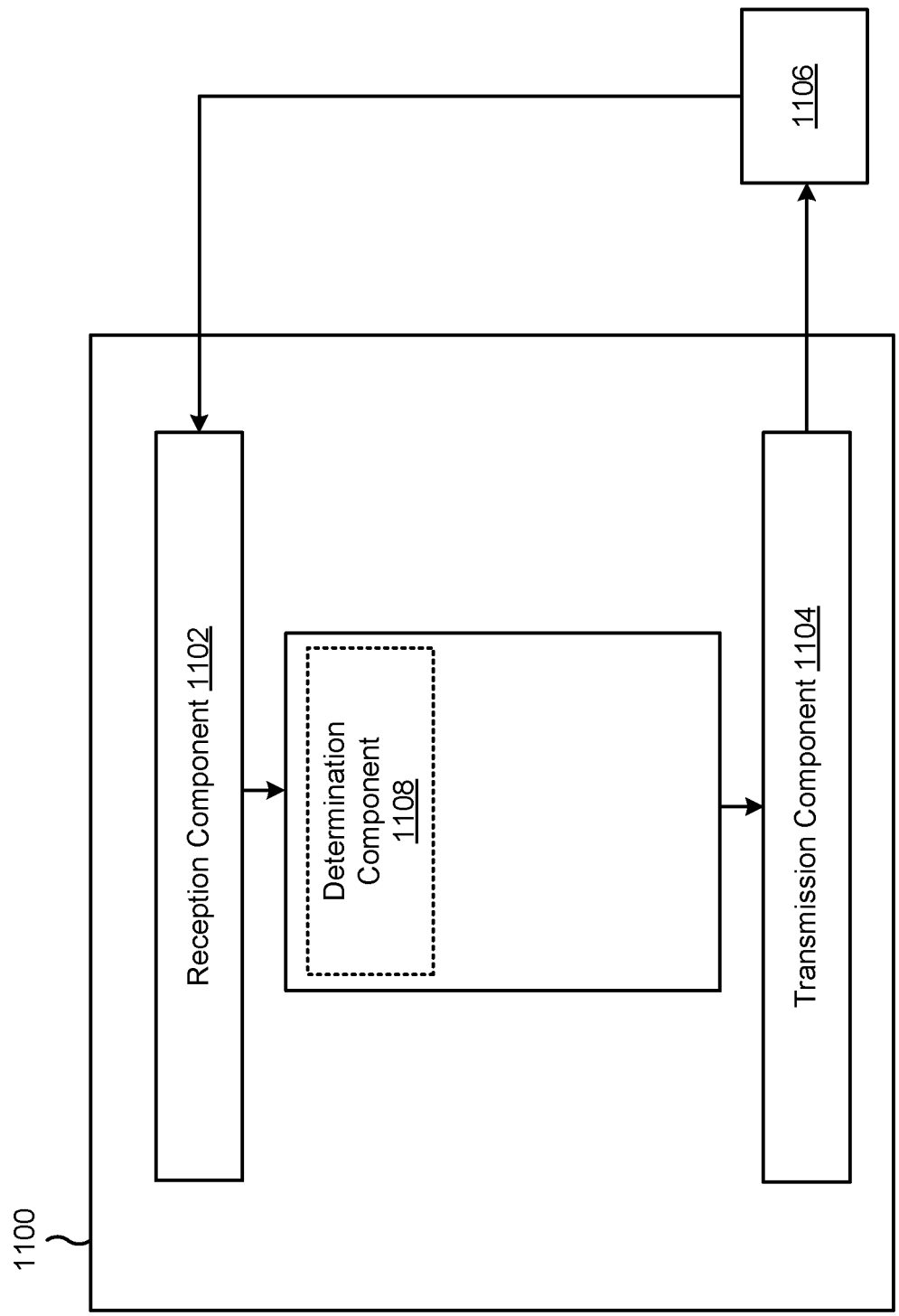

FIG. 11 is a block diagram of an example apparatus 1100 for wireless communication. The apparatus 1100 may be a base station, or a base station may include the apparatus 1100. In some aspects, the apparatus 1100 includes a reception component 1102 and a transmission component 1104, which may be in communication with one another (for example, via one or more buses and/or one or more other components). As shown, the apparatus 1100 may communicate with another apparatus 1106 (such as a UE, a base station, or another wireless communication device) using the reception component 1102 and the transmission component 1104. As further shown, the apparatus 1100 may include a determination component 1108, among other examples.

In some aspects, the apparatus 1100 may be configured to perform one or more operations described herein in connection with FIGS. 1-7. Additionally, or alternatively, the apparatus 1100 may be configured to perform one or more processes described herein, such as process 900 of FIG. 9. In some aspects, the apparatus 1100 and/or one or more components shown in FIG. 11 may include one or more components of the base station described above in connection with FIG. 2. Additionally, or alternatively, one or more components shown in FIG. 11 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1102 may receive communications, such as reference signals, control information, data communications, or a combination thereof, from the apparatus 1106. The reception component 1102 may provide received communications to one or more other components of the apparatus 1100. In some aspects, the reception component 1102 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1106. In some aspects, the reception component 1102 may include one or more antennas, a demodulator, a MIMO detector, a receive processor, a controller/processor, a memory, or a combination thereof, of the base station described above in connection with FIG. 2.

The transmission component 1104 may transmit communications, such as reference signals, control information, data communications, or a combination thereof, to the apparatus 1106. In some aspects, one or more other components of the apparatus 1106 may generate communications and may provide the generated communications to the transmission component 1104 for transmission to the apparatus 1106. In some aspects, the transmission component 1104 may perform signal processing on the generated communications (such as filtering, amplification, modulation, digital-to-analog conversion, multiplexing, interleaving, mapping, or encoding, among other examples), and may transmit the processed signals to the apparatus 1106. In some aspects, the transmission component 1104 may include one or more antennas, a modulator, a transmit MIMO processor, a transmit processor, a controller/processor, a memory, or a combination thereof, of the base station described above in connection with FIG. 2. In some aspects, the transmission component 1104 may be co-located with the reception component 1102 in a transceiver.

The determination component 1108 may determine an indication for an uplink MIMO communication from a UE, indicating whether the uplink MIMO communication is to be CB or NCB. The determination component 1108 may align a DCI size for CB with a DCI size for NCB. The transmission component 1104 may transmit the indication to the UE. The reception component 1102 may receive the uplink MIMO communication as CB or NCB based at least in part on transmitting the indication.

The reception component 1102 may receive, from the UE, a preference for CB or NCB for uplink MIMO communications, and the determination component 1108 may determine the indication based at least in part on the preference received from the UE.

The number and arrangement of components shown in FIG. 11 are provided as an example. In practice, there may be additional components, fewer components, different components, or differently arranged components than those shown in FIG. 11. Furthermore, two or more components shown in FIG. 11 may be implemented within a single component, or a single component shown in FIG. 11 may be implemented as multiple, distributed components. Additionally, or alternatively, a set of (one or more) components shown in FIG. 11 may perform one or more functions described as being performed by another set of components shown in FIG. 11.

The following provides an overview of some aspects of the present disclosure:

Aspect 1: A method of wireless communication performed by a user equipment (UE), comprising: receiving an indication of whether an uplink multiple input multiple output (MIMO) communication is to be codebook-based (CB) or non-codebook-based (NCB); and transmitting the uplink MIMO communication as CB or NCB based at least in part on the indication.

Aspect 2: The method of aspect 1, wherein receiving the indication includes receiving the indication in a medium access control control element.

Aspect 3: The method of aspect 1 or 2, wherein receiving the indication includes receiving the indication in downlink control information (DCI) that schedules the uplink MIMO communication.

Aspect 4: The method of aspect 3, wherein a DCI size for CB is aligned with a DCI size for NCB.

Aspect 5: The method of aspect 3, wherein a DCI size for CB is a same bit length as a DCI size for NCB.

Aspect 6: The method of aspect 3, further comprising padding bits after a scheduling request indicator (SRI) field received in DCI for NCB such that a bit length of the DCI for NCB matches a bit length of the DCI for CB.

Aspect 7: The method of any of aspects 1-6, further comprising: determining a preference for CB or for NCB based at least in part on a determination that a measurement of a downlink reference signal satisfies a measurement threshold; and transmitting the preference.

Aspect 8: The method of aspect 7, wherein determining the preference includes determining that the preference is for CB based at least in part on a determination that downlink interference exceeds an interference threshold.

Aspect 9: The method of aspect 7, wherein determining the preference includes determining that the preference is for NCB based at least in part on a determination that downlink interference does not exceed an interference threshold.

Aspect 10: The method of aspect 7, wherein transmitting the preference includes transmitting the preference in a channel state information (CSI) report.

Aspect 11: The method of aspect 10, wherein the CSI report is a periodic CSI report.

Aspect 12: The method of aspect 10, wherein the preference is reported in CSI part 1.

Aspect 13: A method of wireless communication performed by a base station, comprising: determining an indication for an uplink multiple input multiple output (MIMO) communication from a user equipment (UE), indicating whether the uplink MIMO communication is to be codebook-based (CB) or non-codebook-based (NCB); transmitting the indication to the UE; and receiving the uplink MIMO communication as CB or NCB based at least in part on transmitting the indication.

Aspect 14: The method of aspect 13, wherein transmitting the indication includes transmitting the indication in a medium access control control element.

Aspect 15: The method of aspect 13 or 14, wherein transmitting the indication includes transmitting the indication in downlink control information (DCI) that schedules the uplink MIMO communication.

Aspect 16: The method of aspect 15, further comprising aligning a DCI size for CB with a DCI size for NCB.

Aspect 17: The method of aspect 15, wherein a DCI size for CB is a same bit length as a DCI size for NCB.

Aspect 18: The method of any of aspects 13-17, further comprising receiving, from the UE, a preference for CB or NCB for uplink MIMO communications, wherein determining the indication includes determining the indication based at least in part on the preference received from the UE.

Aspect 19: The method of aspect 18, wherein receiving the preference includes receiving the preference in a channel state information (CSI) report.

Aspect 20: The method of aspect 19, wherein the preference is reported in CSI part 1.

Aspect 21: The method of any of aspects 13-20, wherein determining the indication includes determining the indication based at least in part on a measurement of interference by the base station.

Aspect 22: An apparatus for wireless communication at a device, comprising a processor; memory coupled with the processor; and instructions stored in the memory and executable by the processor to cause the apparatus to perform the method of one or more aspects of aspects 1-21.

Aspect 23: A device for wireless communication, comprising a memory and one or more processors coupled to the memory, the memory and the one or more processors configured to perform the method of one or more aspects of aspects 1-21.

Aspect 24: An apparatus for wireless communication, comprising at least one means for performing the method of one or more aspects of aspects 1-21.

Aspect 25: A non-transitory computer-readable medium storing code for wireless communication, the code comprising instructions executable by a processor to perform the method of one or more aspects of aspects 1-21.

Aspect 26: A non-transitory computer-readable medium storing a set of instructions for wireless communication, the set of instructions comprising one or more instructions that, when executed by one or more processors of a device, cause the device to perform the method of one or more aspects of aspects 1-21.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A user equipment (UE) for wireless communication, comprising:
    a memory; and
    one or more processors operatively coupled to the memory, the memory and the one or more processors configured to:
    receive an indication of whether an uplink multiple input multiple output (MIMO) communication is to be codebook-based (CB) or non-codebook-based (NCB) in a downlink control information (DCI) that schedules the uplink MIMO communication, where a DCI size for CB is aligned with a DCI size for NCB; and
    transmit the uplink MIMO communication as CB or NCB based at least in part on the indication.

2. The UE of claim 1, wherein the one or more processors, when receiving the indication, are configured to receive the indication in a medium access control control element.

3. The UE of claim 1, wherein a DCI size for CB is a same bit length as a DCI size for NCB.

4. The UE of claim 1, wherein the one or more processors are further configured to pad bits after a scheduling request indicator (SRI) field received in DCI for NCB such that a bit length of the DCI for NCB matches a bit length of the DCI for CB.

5. The UE of claim 1, wherein the one or more processors are further configured to:
    determine a preference for CB or for NCB based at least in part on a determination that a measurement of a downlink reference signal satisfies a measurement threshold; and
    transmit the preference.

6. The UE of claim 5, wherein the one or more processors, when determining the preference, are configured to determine that the preference is for CB based at least in part on a determination that downlink interference exceeds an interference threshold.

7. The UE of claim 5, wherein the one or more processors, when determining the preference, are configured to determine that the preference is for NCB based at least in part on a determination that downlink interference does not exceed an interference threshold.

8. The UE of claim 5, wherein the one or more processors, when transmitting the preference, are configured to transmit the preference in a channel state information (CSI) report.

9. The UE of claim 8, wherein the CSI report is a periodic CSI report.

10. The UE of claim 8, wherein the preference is reported in CSI part 1.

11. A base station for wireless communication, comprising:
    a memory; and
    one or more processors operatively coupled to the memory, the memory and the one or more processors configured to:
    determine an indication for an uplink multiple input multiple output (MIMO) communication from a user equipment (UE), indicating whether the uplink MIMO communication is to be codebook-based (CB) or non-codebook-based (NCB) wherein a DCI size for CB is aligned with a DCI size for NCB;
transmit the indication to the UE in downlink control information (DCI) that schedules the uplink MIMO communication; and
receive the uplink MIMO communication as CB or NCB based at least in part on transmitting the indication.

12. The base station of claim 11, wherein the one or more processors, when transmitting the indication, are configured to transmit the indication in a medium access control control element.

13. The base station of claim 11, wherein a DCI size for CB is a same bit length as a DCI size for NCB.

14. The base station of claim 11, wherein the one or more processors are further configured to receive, from the UE, a preference for CB or NCB for uplink MIMO communications and determine the indication based at least in part on the preference received from the UE.

15. The base station of claim 14, wherein the one or more processors, when receiving the preference, are configured to receive the preference in a channel state information (CSI) report.

16. The base station of claim 15, wherein the preference is reported in CSI part 1.

17. The base station of claim 11, wherein the one or more processors, when determining the indication, are configured to determine the indication based at least in part on a measurement of interference by the base station.

18. A method of wireless communication performed by a user equipment (UE), comprising:
receiving an indication of whether an uplink multiple input multiple output (MIMO) communication is to be codebook-based (CB) or non-codebook-based (NCB) in a downlink control information (DCI) that schedules the uplink MIMO communication, where a DCI size for CB is aligned with a DCI size for NCB; and
transmitting the uplink MIMO communication as CB or NCB based at least in part on the indication.

19. The method of claim 18, wherein a DCI size for CB is a same bit length as a DCI size for NCB.

20. The method of claim 18, further comprising padding bits after a scheduling request indicator (SRI) field received in DCI for NCB such that a bit length of the DCI for NCB matches a bit length of the DCI for CB.

21. A method of wireless communication performed by a base station, comprising:
determining an indication for an uplink multiple input multiple output (MIMO) communication from a user equipment (UE), indicating whether the uplink MIMO communication is to be codebook-based (CB) or non-codebook-based (NCB) wherein a DCI size for CB is aligned with a DCI size for NCB;
transmitting the indication to the UE in downlink control information (DCI) that schedules the uplink MIMO communication; and
receiving the uplink MIMO communication as CB or NCB based at least in part on transmitting the indication.

22. The method of claim 21, wherein a DCI size for CB is a same bit length as a DCI size for NCB.

* * * * *